US012728355B2

(12) United States Patent
Dorn et al.

(10) Patent No.: US 12,728,355 B2
(45) Date of Patent: Sep. 8, 2026

(54) SYSTEMS AND METHODS FOR GENERATING NONPLAYER CHARACTERS ACCORDING TO GAMEPLAY CHARACTERISTICS

(71) Applicants: Sony Interactive Entertainment Inc., Tokyo (JP); Sony Interactive Entertainment LLC, San Mateo, CA (US)

(72) Inventors: Victoria Dorn, Hayward, CA (US); Daniel Reifsnider, San Diego, CA (US); Nataliya Goji, Madison, AL (US); Angela Bartolome, San Diego, CA (US); Jessica Chiang, San Mateo, CA (US)

(73) Assignees: Sony Interactive Entertainment Inc., Tokyo (JP); Sony Interactive Entertainment LLC, San Mateo, CA (US)

( * ) Notice: Subject to any disclaimer, the term of this patent is extended or adjusted under 35 U.S.C. 154(b) by 349 days.

(21) Appl. No.: 18/458,998

(22) Filed: Aug. 30, 2023

(65) Prior Publication Data

US 2025/0073594 A1 Mar. 6, 2025

(51) Int. Cl.
*A63F 13/67* (2014.01)

(52) U.S. Cl.
CPC .................................... *A63F 13/67* (2014.09)

(58) Field of Classification Search
CPC ........... A63F 13/67; A63F 13/79; A63F 13/56
See application file for complete search history.

(56) References Cited

U.S. PATENT DOCUMENTS 5,830,067 A * 11/1998 Graves .................... G07F 17/32 463/19
6,024,643 A * 2/2000 Begis .................... A63F 13/798 463/1
6,244,957 B1 * 6/2001 Walker .................... G07F 17/32 463/20
6,485,367 B1 * 11/2002 Joshi .................. G07F 17/3293 463/20
10,286,322 B1 * 5/2019 Wakeford ............... A63F 13/57
10,394,414 B1 * 8/2019 Wakeford ............... A63F 13/67
10,940,393 B2 3/2021 Somers et al.
2006/0154710 A1 * 7/2006 Serafat .................... A63F 13/12 463/29
2006/0246972 A1 * 11/2006 Thomas .................. A63F 13/00 463/4

(Continued)

OTHER PUBLICATIONS

International Search Report and Written Opinion in International Appln. No. PCT/US2024/042812, mailed on Nov. 21, 2024, 9 pages.

*Primary Examiner* — Steve Rowland
(74) *Attorney, Agent, or Firm* — Fish & Richardson P.C.

(57) ABSTRACT

Systems and methods for generating nonplayer characters are described. An artificial intelligence (AI) model is trained based on gameplay by one or more users to generate the nonplayer characters. The nonplayer characters have similar gameplay characteristics as that of a game character controlled by one of the users. The AI model is trained to have a percentage of gameplay characteristics learned from gameplay by the one the users and a percentage of gameplay characteristics from gameplay by another one of the users.

20 Claims, 10 Drawing Sheets

(56) References Cited

U.S. PATENT DOCUMENTS

2006/0287075 A1* 12/2006 Walker ................ G07F 17/3269 463/25
2007/0298886 A1* 12/2007 Aguilar, Jr. ............. G07F 17/32 463/42
2008/0097948 A1 4/2008 Funge et al.
2008/0318656 A1* 12/2008 Walker ................ G07F 17/3262 463/20
2012/0015746 A1* 1/2012 Mooney ................ A63F 13/795 463/42
2013/0035164 A1* 2/2013 Osvald .................... A63F 13/20 463/42
2014/0018143 A1* 1/2014 Yarbrough .......... G07F 17/3262 463/19
2014/0342808 A1* 11/2014 Chowdhary .......... A63F 13/493 463/24
2014/0349766 A1* 11/2014 Kim ........................ A63F 13/69 463/42
2016/0067612 A1 3/2016 Ntoulas et al.
2018/0001205 A1* 1/2018 Osman .................... A63F 13/67
2018/0256981 A1* 9/2018 Enomoto ................ A63F 13/67
2019/0321727 A1* 10/2019 Rodgers ................ A63F 13/335
2020/0197815 A1* 6/2020 Beltran ................... A63F 13/44
2020/0289943 A1* 9/2020 Rico ....................... A63F 13/67
2020/0306638 A1 10/2020 Fear et al.
2020/0324206 A1 10/2020 Yilmazcoban et al.
2021/0001229 A1* 1/2021 Somers .................. G06N 3/082
2021/0146258 A1 5/2021 Pedersen et al.
2022/0309364 A1 9/2022 Perry et al.
2023/0310995 A1 10/2023 Saeedi et al.
2024/0375013 A1 11/2024 Henderson

* cited by examiner

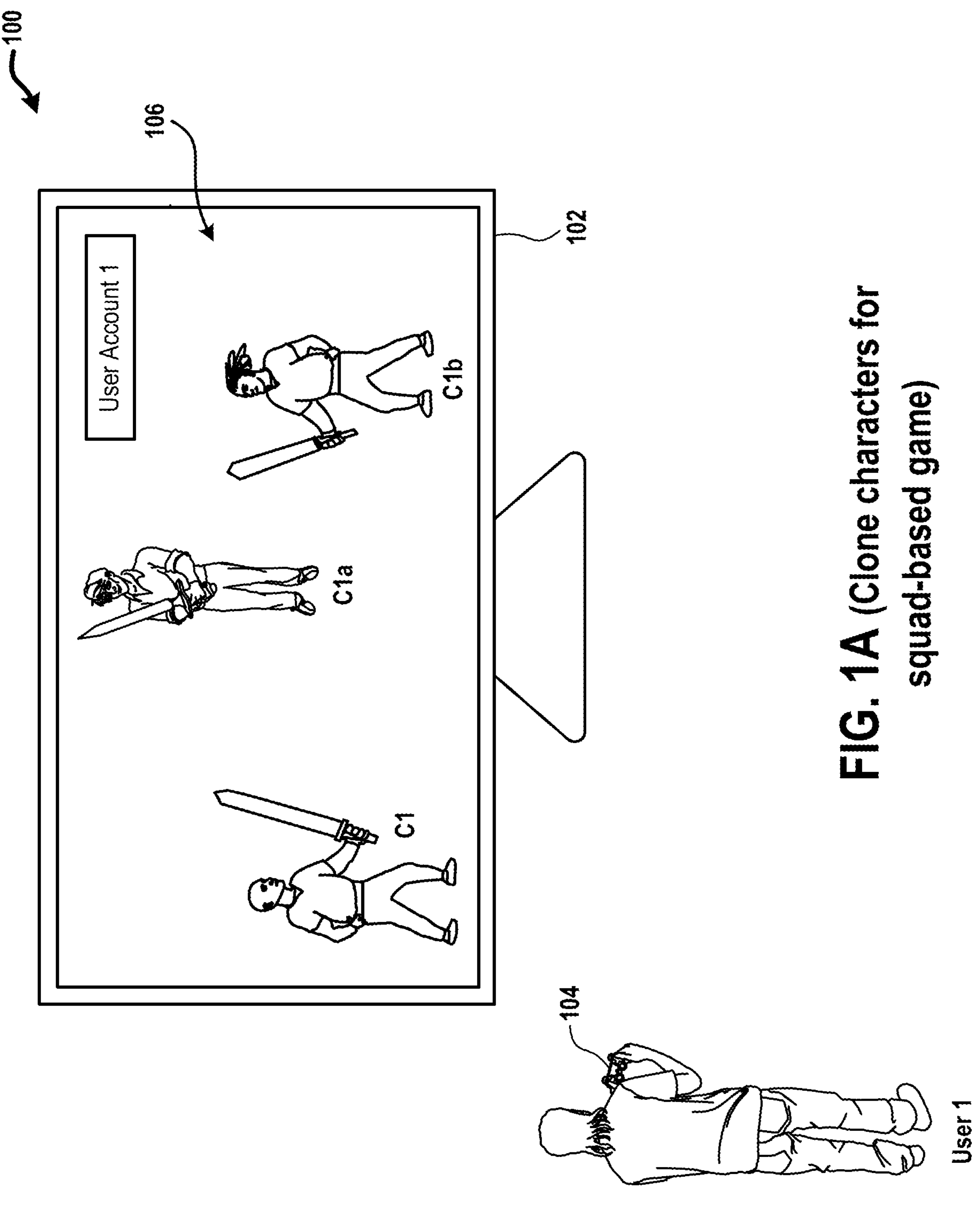
FIG. 1A (Clone characters for squad-based game)

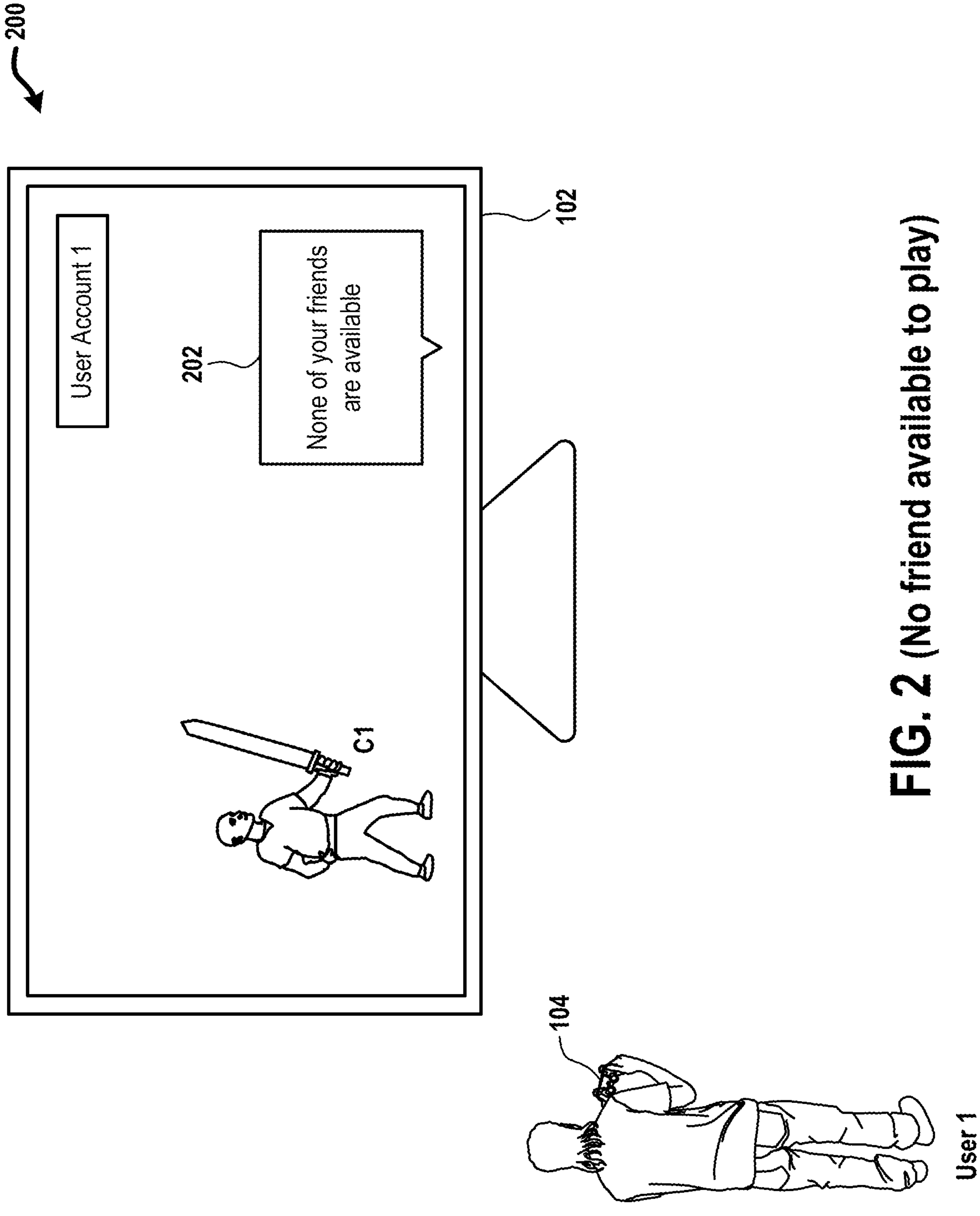
FIG. 2 (No friend available to play)

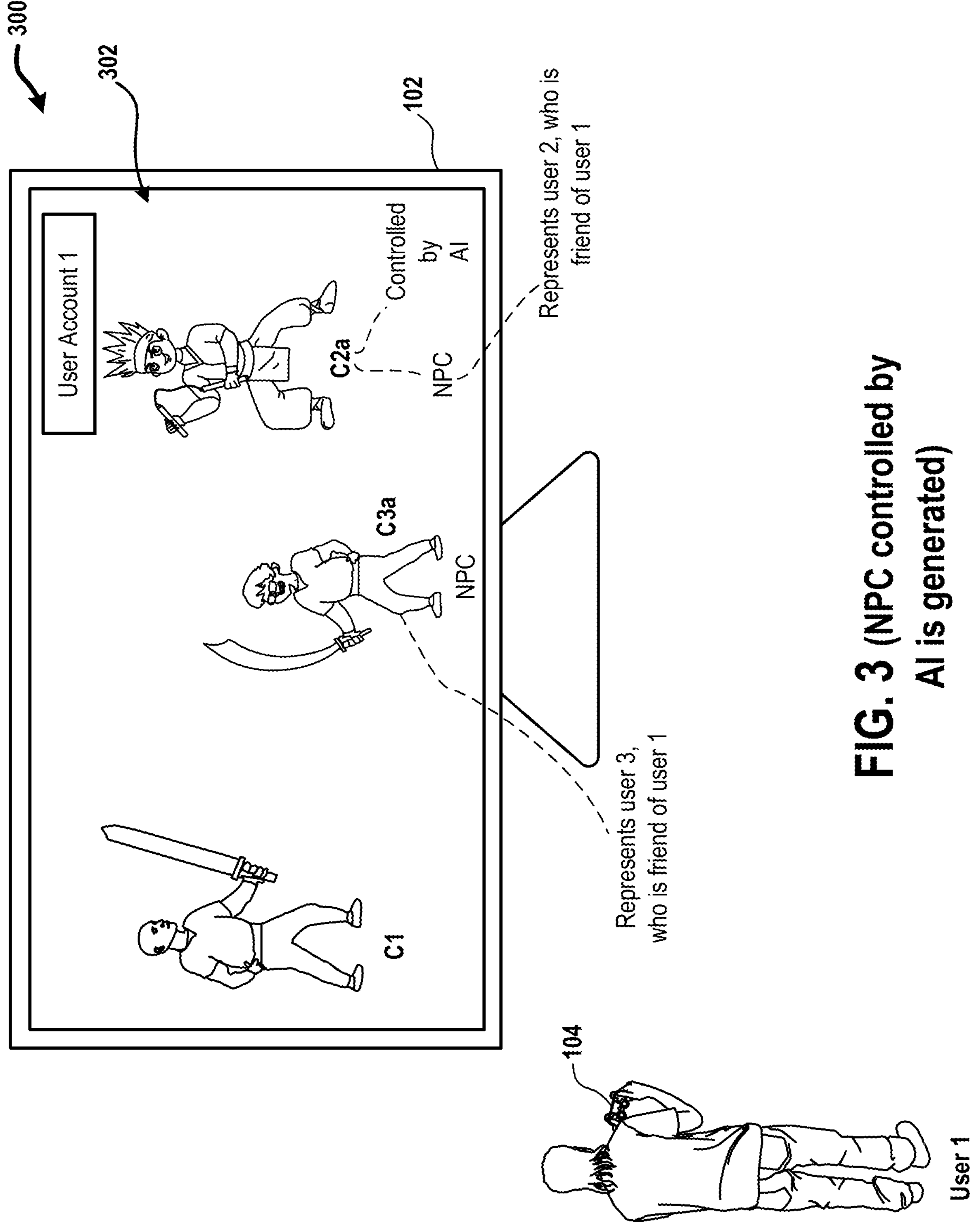
FIG. 3 (NPC controlled by AI is generated)

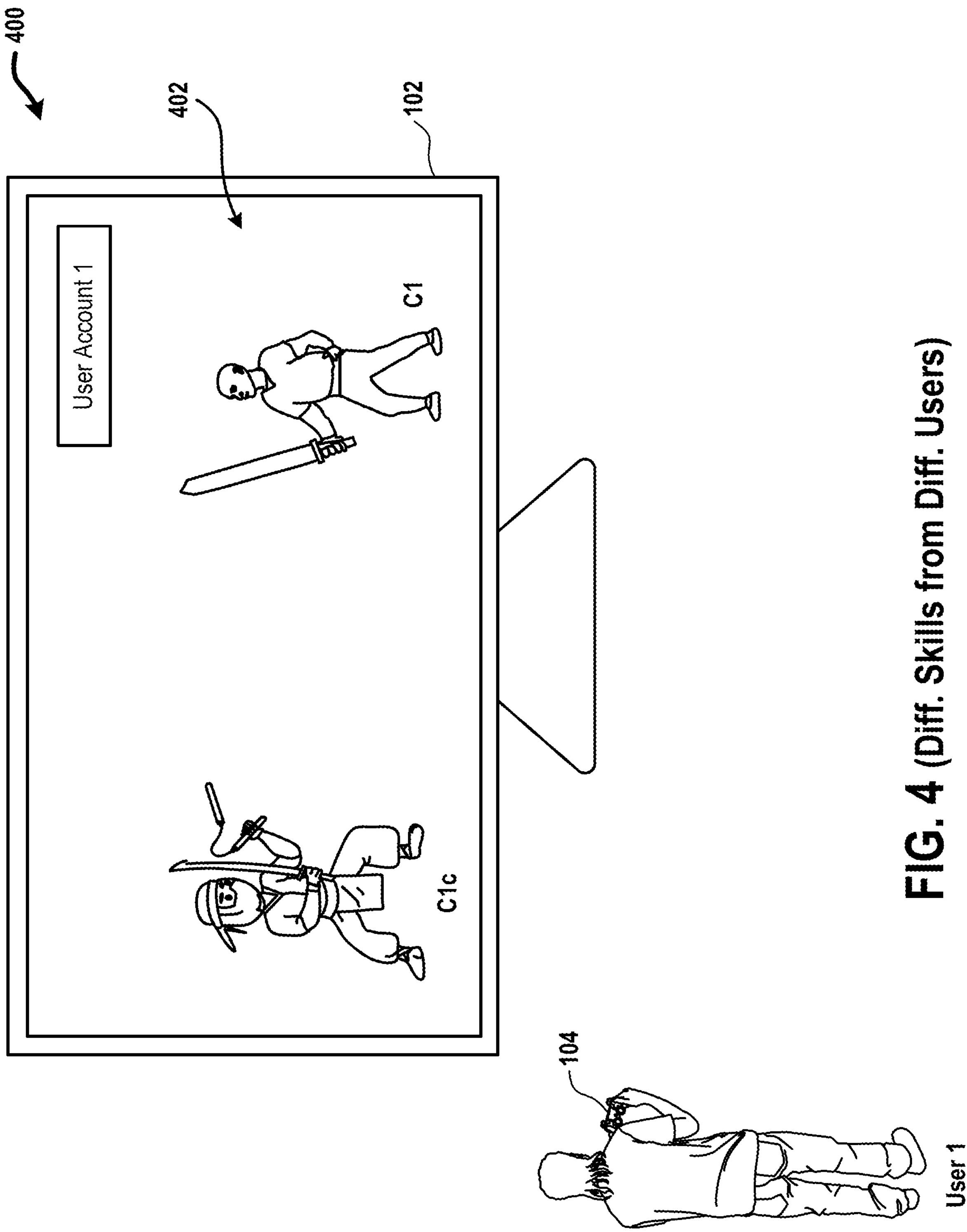
FIG. 4 (Diff. Skills from Diff. Users)

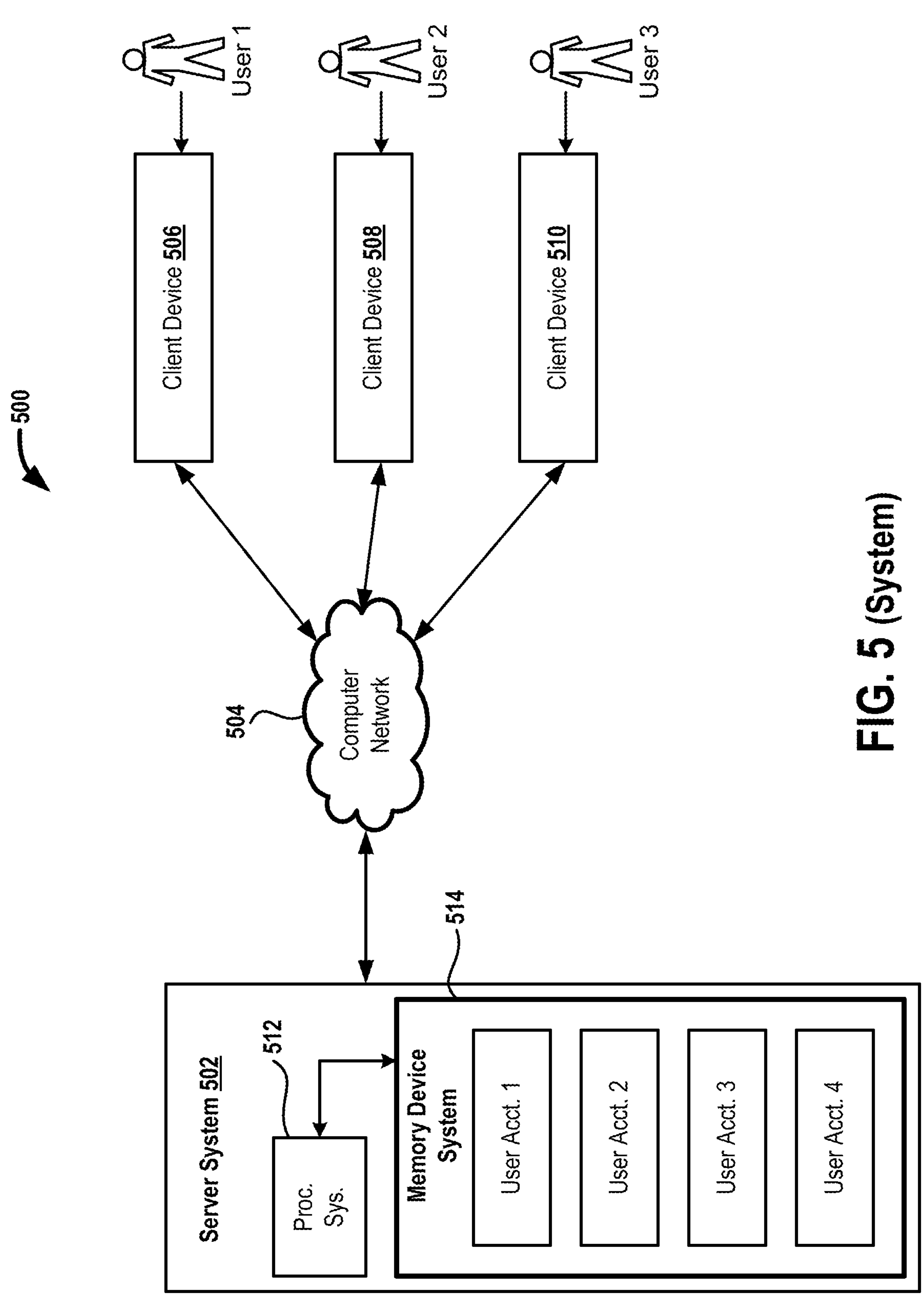
FIG. 5 (System)

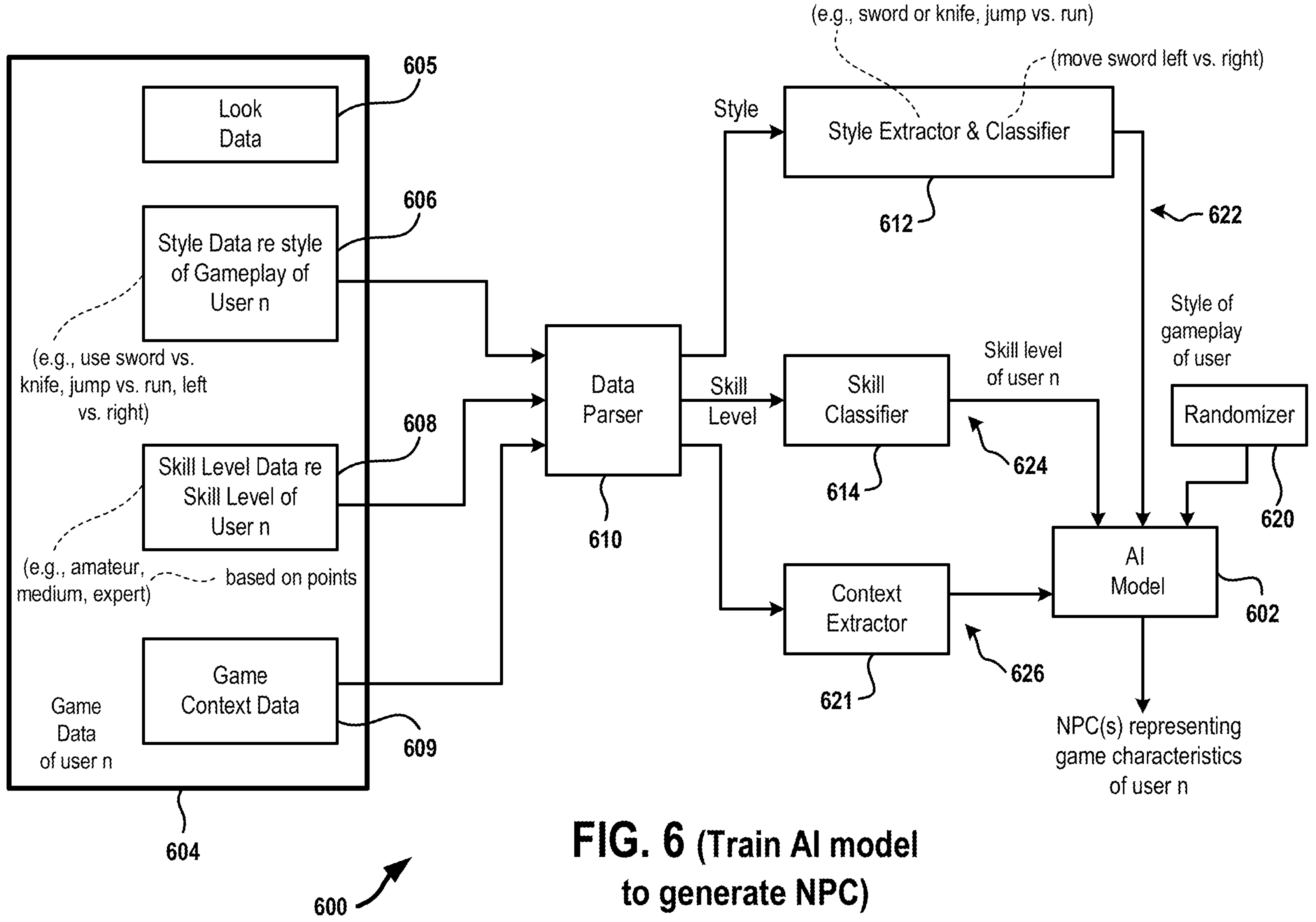
FIG. 6 (Train AI model to generate NPC)

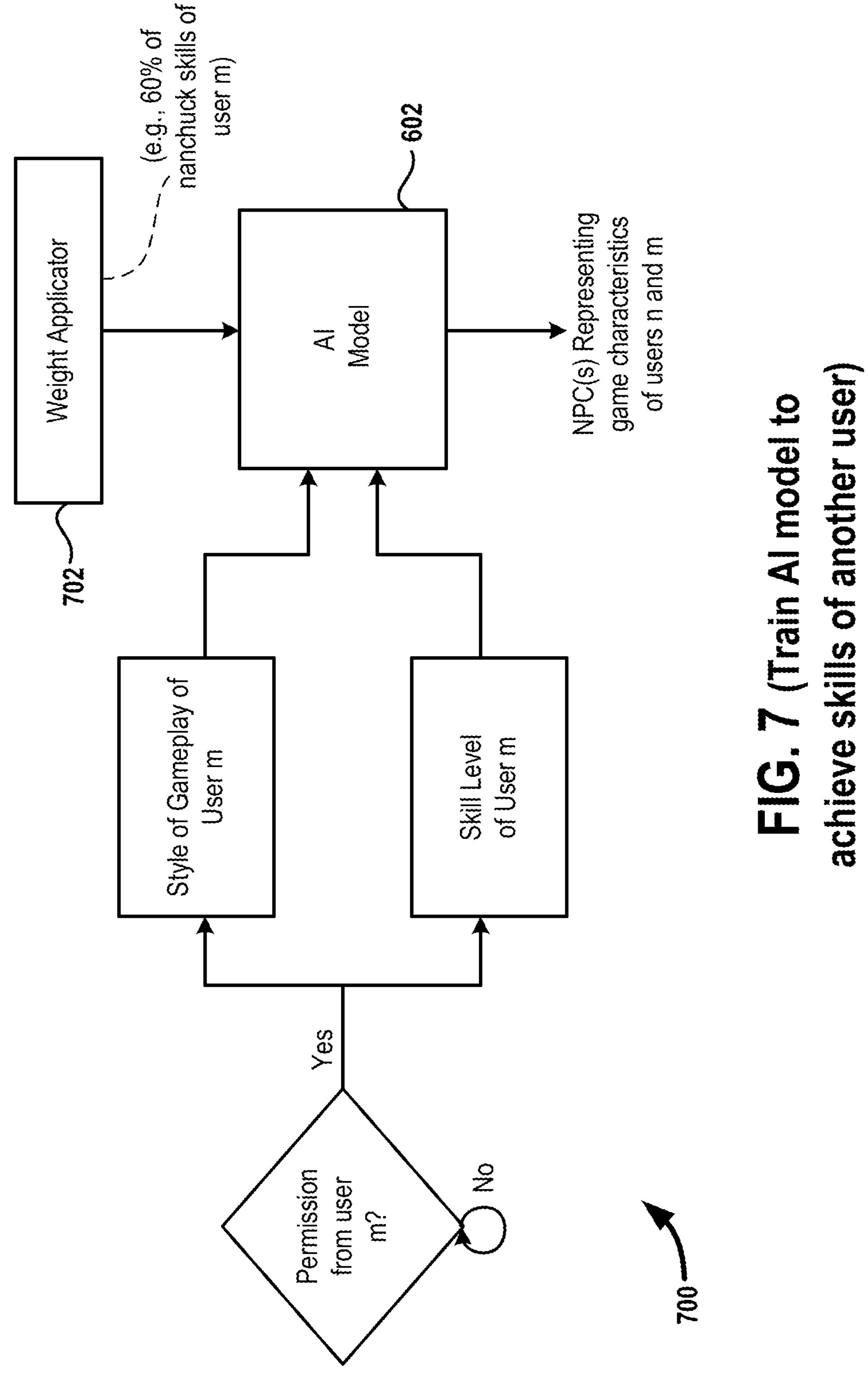
FIG. 7 (Train AI model to achieve skills of another user)

SYSTEMS AND METHODS FOR GENERATING NONPLAYER CHARACTERS ACCORDING TO GAMEPLAY CHARACTERISTICS

FIELD

The present disclosure relates to systems and methods for generating nonplayer characters according to gameplay characteristics are described.

BACKGROUND

The online gaming industry has seen many changes over the years and has been trying to find ways to enhance video game play experiences for players and increase player engagement with video games and/or online gaming systems. When a player increases his/her engagement with a video game, the player is more likely to continue playing the video game and play the video game more frequently.

A growing trend in the video game industry is online harassment and cyber bullying in video games by players commonly referred to as abusive players, bad faith players, griefers and/or disruptive players. For example, a disruptive player can be a player in a multiplayer video game who deliberately irritates, annoys, and harasses other players of the video game. In some instances, the disruptive player will use aspects of the video game in unintended ways to disrupt normal play of the video game. The disruptive actions by disruptive players in the video game can prevent other good faith players from becoming fully immersed in their play of the video game, and thereby diminish the good faith player's game play experience. Unfortunately, identifying disruptive players and monitoring their actions during their play of the video game can be difficult and can utilize a significant amount of resources, including computing resources, human resources, energy resources, economic resources, data storage resources, and data communication bandwidth resources, among other types of resources. Therefore, management of disruptive players in the video games is not currently done as well as possible.

It is in this context that embodiments of the invention arise.

SUMMARY

Embodiments of the present disclosure provide systems and methods for generating nonplayer characters according to gameplay characteristics.

In an embodiment, a method for matching a user, such as a gamer or a player, with artificial intelligence (AI) friends, is described. If the player wants to play a squad-based game, e.g., a co-op game, or a multiplayer game, the player finds other players to play with. If available players have skills of a low level or have negative behavior, such as rudeness or anger or other disruptive behavior, the player is discouraged from playing the squad-based game.

In one embodiment, a method provides an AI model that learns player characteristics by using game data, history, scores, and style of play of the player. The player characteristics are sometimes referred to herein as game characteristics. The AI model determines a type of the player based on the player characteristics to generate data for displaying a non-player character (NPC). The NPC is created to play with the player. The NPC player is an AI player or an AI friend that will behave similar to the style of the play of the player and is compatible with the squad-based game.

In one embodiment, if the player logs in and there are no other players, such as real people, to play the squad-based game with, the system can generate one or more custom AI players, such as NPCs. Each custom AI player is a little different, and have slightly different tendencies, but still be compatible with the player. This allows for playing a game with multiple AI players, and provide good enjoyment to the player, regardless if there are actual real people available to play or when the player does not wish to play with other players with disruptive behavior.

In an embodiment, an AI player is modeled on one of gaming network friends of the player, and the AI player has the tenancies and skills of the gaming network friend.

In one embodiment, an AI player modeled after the player can be made available to other players, such as the gaming network friends, in case the player is not available to play.

Some advantages of the herein described systems and methods include using the AI model to generate data for displaying one or more NPCs. The NPCs play the squad-based game based on the game characteristics of the player. By providing the NPCs that adapt over time to the game characteristics of the player, the player continues to be interested in the squad-based game. Also, the NPCs are generated to protect the player from other players who behave in a negative manner against the player. Also, additional advantages of the herein described systems and methods include using the AI model to generate one or more NPCs that play the squad-based game according to game characteristics of different players. For example, an NPC plays the squad-based game for some time period based on the game characteristics of the player and for another time period based on the game characteristics of the gaming network friend. In this manner, the NPC that represents the best of skills learned from each player can be generated.

Further advantages of the systems and methods described herein include adding enough NPCs to allow the player to play the squad-based game. Also, the NPCs can be used for tutorials in which the player learns how to play the squad-based game. For example, a virtual character controlled by the player interacts with the NPCs to allow the player to learn the squad-based game.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 1A is a diagram of an embodiment of a system to illustrate cloning of characters for a game.

FIG. 2 is a diagram of an embodiment of a system to illustrate that no friend of the user is available to play the game.

FIG. 3 is a diagram of an embodiment of a system to illustrate that when another user is not logged into a user account assigned to the other user, multiple non-player characters (NPCs) are generated by an artificial intelligence (AI) model and are controlled by the AI model and a game program to interact with a virtual character.

FIG. 4 is a diagram of an embodiment of a system to illustrate an NPC that is generated based on skills from different users.

FIG. 5 is a diagram of an embodiment of a system to illustrate a network, such as a gaming network, for generation of NPCs.

FIG. 6 is a diagram of an embodiment of a system to illustrate training of the AI model to generate data for displaying an NPC.

FIG. 7 is a diagram of an embodiment of a system to illustrate that game characteristics of multiple users are weighted and then applied by the AI model to generate data for displaying an NPC.

DETAILED DESCRIPTION

Figures 1B, 1C:
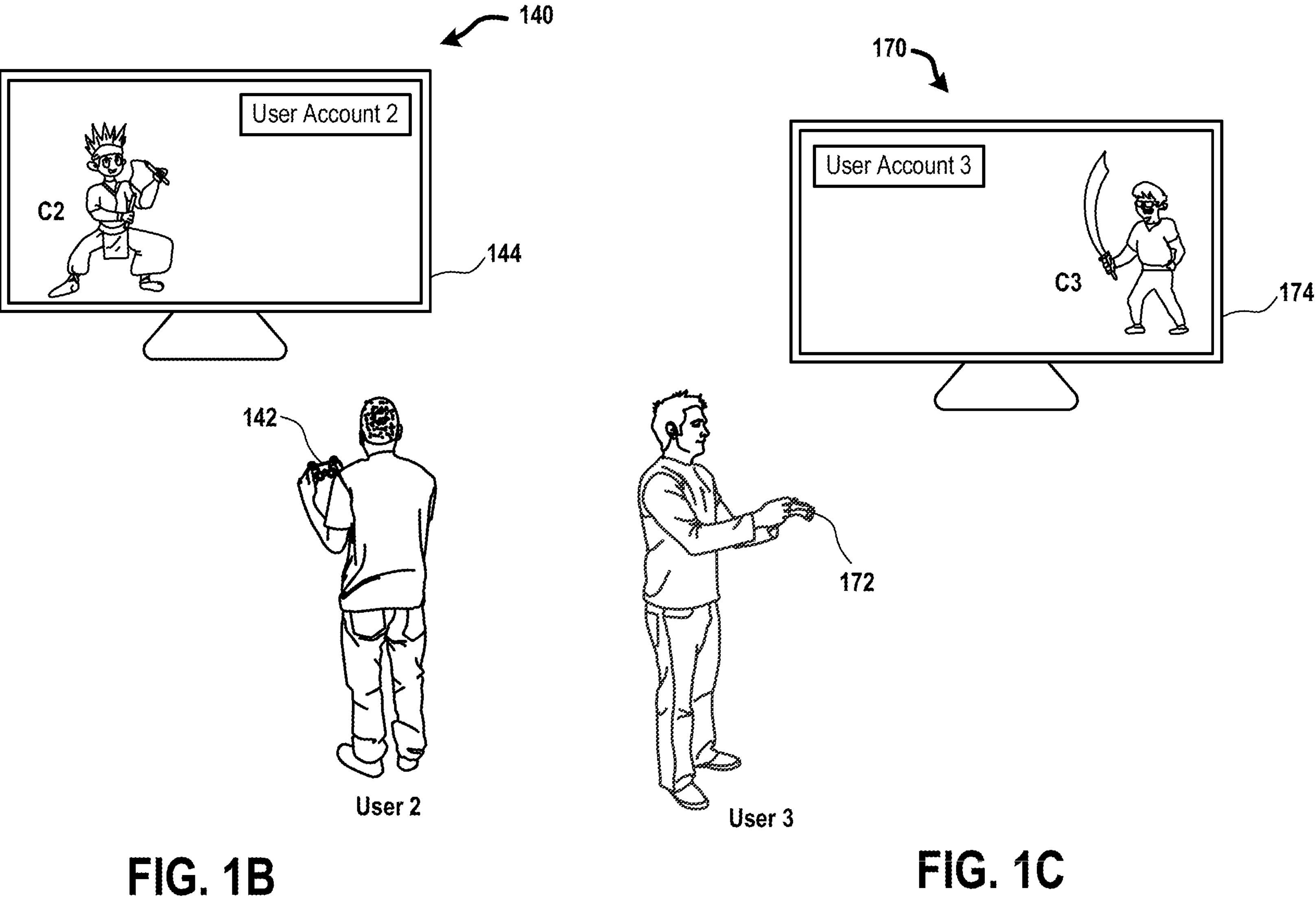
FIG. 1B is a diagram of an embodiment of a system to illustrate use of a hand-held controller (HHC) and a display device by another user.
FIG. 1C is a diagram of an embodiment of a system to illustrate use of an HHC and a display device by yet another user.

Systems and methods for generating nonplayer characters according to gameplay characteristics are described. It should be noted that various embodiments of the present disclosure are practiced without some or all of these specific details. In other instances, well known process operations have not been described in detail in order not to unnecessarily obscure various embodiments of the present disclosure.

FIG. 1A is a diagram of an embodiment of a system 100 to illustrate cloning of virtual characters for a game. Examples of the game include a multiplayer video game, such as a squad-based game. The system 100 includes a display device 102 and a hand-held controller (HHC) 104. Examples of a display device, as used herein, include a smart television, a television, a computer display, a smart phone, and a tablet.

A user 1, such as a player, logs into a user account 1 that is assigned to the user 1 by a server system. After logging in, the user 1 accesses a session of the game. The session of the game is sometimes referred to herein as a gaming session or a game session. An example of the session includes a continuous time period during which a game program of the game is executed to generate virtual scenes of the game. To illustrate, the session starts when a game title of the game is displayed on the display device 102 and ends when the user 1 ends the game, such as by turning off a client device operated by the user 1 or by logging out of the user account 1 or by exiting the game. As another illustration, a gaming session for a user account begins when the server system executes the game program to generate data for displaying one or more virtual scenes of the game and ends when the server system stops executing the game program for the user account. An example of the client device operated by the user 1 includes a combination of the display device 102 and the HHC 104.

When the game program of the game is executed by the server system after the user 1 logs into the user account 1, a virtual scene 106 having a virtual character C1 that is controlled by the user 1 via the HHC 104 is displayed on the display device 102. Moreover, data for displaying and operating, such as moving, non-player characters (NPCs) C1*a* and C1*b* is generated when an artificial intelligence (AI) model is applied. The display device 102 displays the NPCs C1*a* and C1*b* in the virtual scene 106. The AI model is executed by the server system to be applied. The NPCs C1*a* and C1*b* are not controlled by any user but are controlled by the AI model based on the game program and game characteristics of the user 1. The data for displaying and operating the NPCs C1*a* and C1*b* is generated by the AI model and is output from the AI model. The AI model generates data for displaying and operating the NPCs C1*a* and C1*b* based on the game characteristics of the user 1. Examples of game characteristics of a user include a style of gameplay of the game by the user, or a skill level of the user 1 in playing the game, or a combination thereof.

When the data for displaying and operating the NPCs C1*a* and C1*b* is generated based on the game characteristics of the user 1, the NPCs C1*a* and C1*b* have substantially similar game skills or have substantially similar gameplay styles or a combination thereof as that of the user 1. For example, when the AI model determines, based on training, that the user 1 controls, via the HHC 104, the virtual character C1 to use a long sword during a majority of instances from a total number of instances for which the AI model is trained, the AI model controls the NPC C1*a* to use the long sword. The AI model is trained based on the total number of instances of use of one or more virtual weapons by the virtual character C1 controlled by the user 1. As another example, when the AI model determines, based on training, that the user 1 has a low skill level during a majority of gaming sessions from a total number of gaming sessions for which the AI model is trained, the AI model controls the NPC C1*a* to operate, such as function, according to the low skill level. To illustrate, the AI model controls the NPC C1*a* to accumulate a number of virtual rewards less than a first threshold over a time interval. The time interval extends over one or more gaming sessions and is a time period for which the AI model is trained based on the game characteristics of the user 1.

The user 1 uses the HHC 104 to further control movement of the virtual character C1 and any type of virtual weapons, such as the long sword, held by the virtual character C1. Based on movement of the character C1 and types and movement of the virtual weapons, the server system executes the AI model in association with the game program to control movement of one or more of the NPCs C1*a* and C1*b* and types and movement of one or more virtual weapons, such as the long sword, held by the NPCs1 C1*a* and C1*b* to interact with the virtual character C1.

In one embodiment, instead of a display device, such as the display device 102, illustrated in FIG. 1A, another display device, such as a head-mounted display (HMD) or an eyeglass, is worn by a user on his/her head to play the game.

In an embodiment, instead of an HHC, such as the HHC 104, another input device, such as a keyboard or a combination of the keyboard and a mouse, is used by a user.

In one embodiment, data for displaying any number of NPCs is generated by the server system in the same manner in which data for displaying the NPCs C1*a* and C1*b* is generated.

FIG. 1B is a diagram of an embodiment of a system 140 to illustrate use of an HHC 142 and a display device 144 by a user 2. The system 140 includes the HHC 142 and the display device 144. The user 2 uses the HHC 142 to log into a user account 2 that is assigned to the user 2 by the server system. Upon accessing the user account 2, the user 2 uses the HHC 142 to access the game and a virtual character C2.

The virtual character C2 is then controlled by the user 2 via the HHC 142 to play the game. The user 2 holds the HHC 142 to play the game when a virtual scene of the game is displayed on the display device 144.

FIG. 1C is a diagram of an embodiment of a system 170 to illustrate use of an HHC 172 and a display device 174 by a user 3. The system 170 includes the HHC 172 and the display device 174. The user 3 uses the HHC 172 to log into a user account 3 that is assigned to the user 3 by the server system. Upon accessing the user account 3, the user 3 uses the HHC 172 to access the game and a virtual character C3. The virtual character C3 is then controlled by the user 3 via the HHC 172 to play the game. The user 3 holds the HHC 172 to play the game when a virtual scene of the game is displayed on the display device 174.

FIG. 2 is a diagram of an embodiment of a system 200 to illustrate that no friend of the user 1 is available to play the game. The system 200 includes the display device 102 and the HHC 104. After the user 1 logs into the user account 1, the server system determines whether any of gaming network friends of the user 1 are logged into their user accounts. As an example, a user, described herein, makes a gaming network friend when the user invites another user, such as a real-life friend or a real life acquaintance, through e-mail, a gaming network for playing the game, an invite link, or a social media platform. The gaming network includes the user accounts of the users. The user accounts of the gaming network friends are assigned to the gaming network friends by the server system.

In response to determining that none of the gaming network friends of the user 1 are logged into the gaming network, the server system generates data for displaying a notification 202 via the user account 1. The server system sends the data for displaying the notification 202 via a computer network, described below, to the display device 102. In response to receiving the data for displaying the notification 202, a graphical processing unit (GPU) of the display device 102 displays the notification 202.

FIG. 3 is a diagram of an embodiment of a system 300 to illustrate that when another user, such as the user 2 or a user 3, is not logged into a user account assigned to the other user by the server system, NPCs C2*a* and C3*a* are generated by the AI model and are controlled by the AI model based on the game program to interact with the virtual character C1. The system 300 includes the display device 102 and the HHC 104.

When the users 2 and 3 are not logged into their assigned user accounts 2 and 3, the AI model generates data for displaying and operating the NPCs C2*a* and C3*a*. For example, after the notification 202 (FIG. 2) is displayed on the display device 102, the NPCs C2*a* and C3*a* are displayed within a virtual scene 302 displayed on the display device 102. The NPCs C2*a* and C3*a* are not controlled by any user but are controlled by the AI model in conjunction with the game program. Also, the data for displaying the NPCs C2*a* and C3*a* is generated by the AI model and is output from the AI model. The AI model generates data for displaying the NPC C2*a* based on game characteristics of the user 2 and generates data for displaying the NPC C3*a* based on game characteristics of the user 3. The NPCs C2*a* and C3*a* are controlled by the AI model based on the game program to interact with the virtual character C1.

In one embodiment, after the notification 202 (FIG. 2) is displayed on the display device 102, the server system generates data for displaying another notification on the display device 102. The other notification requests whether the user 1 wishes to play the game. Upon receiving a response generated by the user 1 via the HHC 104 that the user 1 wishes to play the game, the server system generates one or more of the NPCs C1*a*, C2*a* and C3*a*.

In an embodiment, when the user 1 logs into the user account 1, the server system generates data for displaying a notification whether the user 1 wishes to play with his/her gaming network friends or any other users or a combination thereof. The data for displaying the notification is sent from the server system via the computer network to the display device 102. In response to receiving the data, the display device 102 displays the notification. Upon reviewing the notification, the user 1 uses the HHC 104 to provide an indication that the user 1 does not wish to play the game with the gaming network friends or the other users or a combination thereof. For example, in response to receiving a selection of one or more control buttons on the HHC 104, the HHC 104 generates a user input indicating the selection. The user input is an example of the indication that the user does not wish to play the game with the gaming network friends or the other users or a combination thereof. The client device operated by the user 1 sends the indication via the computer network to the server system. Upon receiving the indication from the user 1 via the HHC 104 that the user 1 does not wish to play with the gaming network friends, the server system does not allow data for displaying one or more virtual characters, such as the virtual character C2 (FIG. 1B), controlled by the gaming network friends or the other users or a combination thereof to be sent via the computer network to the client device operated by the user 1. Also, in response to receiving the indication from the user 1 via the HHC 104 that the user 1 does not wish to play with the gaming network friends or the other users or a combination thereof, the server system accesses the AI model in conjunction with the game program to generate and operate one or more of the NPCs, such as the NPCs C1*a* and C1*b* (FIG. 1), described herein. For example, the server system executes the AI model in association with the game program to generate and operate the one or more of the NPCs.

FIG. 4 is a diagram of an embodiment of a system 400 to illustrate a nonplayer character C1*c* that is generated based on skills from different users. The system 400 includes the display device 102 and the HHC 104. Data for displaying and operating the NPC C1*c* is generated by the AI model in conjunction with the game program. For example, the AI model is trained to generate the data for displaying the NPC C1*c* within a virtual scene 402 based on game characteristics of multiple users, such as the users 1 and 2, or 2 and 3, or 1 and 3 or 1, 2, and 3. Also, the AI model is executed in association with the game program to operate the NPC C1*c*. To illustrate, the AI model is trained to generate the data for displaying and operating the NPC C1*c* based on one or game characteristics of the user 1 and one or game characteristics of one or more other users, such as the user 2 or the user 3 or both the users 2 and 3. To further illustrate, the NPC C1*c* is skilled in using a curved sword and nunchuks as virtual weapons to interact with the virtual character C1 in the virtual scene 402. The user 2 is skilled in using the nunchuks with the virtual character C2 that is controlled by the user 2 as the virtual weapon and the user 3 is skilled in using the curved sword with the virtual character C3 that is controlled by the user 3.

The user 1 logs into the user account 1 and accesses the virtual character C1 from the server system to play the game. After the notification 202 (FIG. 2) is displayed on the display device 102, the NPC C1*c* is displayed on the display device 102. The NPC C1*c* is controlled by the AI model based on the game program to interact with the virtual character C1.

FIG. 5 is a diagram of an embodiment of a system 500 to illustrate a network, such as a gaming network, for generation of NPCs, described herein. The system 500 includes a server system 502, a computer network 504, and multiple client devices 506, 508, and 510. An example of a server system, as used herein, includes one or more servers that are coupled to each other to communicate with each other. Each server includes one or more processors and one or more memory devices. The one or more processors are coupled to the one or more memory devices. Examples of a client device include a smart phone, or a combination of an HHC and a display device, or a combination of an HHC, a game console, and a display device, or a combination of one or more input devices and a display device. An example of an input device includes a keyboard or a mouse. Examples of the computer network 504 include a local area network, such as an intranet, or a wide area network, such as the Internet.

The server system 502 includes a processor system 512 and a memory device system 514. As an example, a processor system includes one or more processors and a memory device system includes one or more memory devices. The processor system 512 is coupled to the memory device system 514. Within the memory device system 514, the user account 1 assigned to the user 1 by the processor system 512 is stored. Similarly, the user account 2 assigned to the user 2 by the processor system 512 is stored in the memory device system 514 and the user account 3 assigned to the user 3 by the processor system 512 is stored in the memory device system 514.

Each user 1, 2, or 3, uses a respective one of the client devices 506, 508, and 510 to communicate via the computer network 504 with the server system 502. The processor system 512 executes the game program and the AI model, both of which are stored in the memory device system 514.

In an embodiment, the processor system 512 determines whether a performance of an NPC, described herein, is greater than a predetermined threshold. Upon determining that the performance is less than the predetermined threshold, the processor system 512 modifies the NPC. For example, the processor system 512 removes the NPC or replaces the NPC with another NPC. To illustrate, in response to determining that the NPC is not a good match for a squad or to achieve a goal, such as fighting a virtual character, of the squad, the processor system 512 removes or replaces the NPC.

FIG. 6 is a diagram of an embodiment of a system 600 to illustrate training of the AI model, such as an AI model 602, to generate data for displaying and operating an NPC, described herein. The system 600 includes game data 604, including game state data, of gameplay by a user n of the game, where n is an integer greater than zero. As an example, the game data 604 includes game characteristics data, which define game characteristics of gameplay of the game by the user n. Examples of n include 1, 2, and 3. The user account 1, 2, or 3 is sometimes referred to herein as a user account n. The game characteristics data includes style data 606 regarding style of gameplay of the game by the user n, skill level data 608 regarding skill level of the gameplay, and game context data 609. An example of the game context data 609 is the game state data. The game data 604 further includes look data 605, which is graphical data of a virtual character, such as the virtual character C1 (FIG. 1), that is controlled by the user n during the game. Examples of graphical data, as used herein, include size, shape, color, texture, intensity, or a combination thereof. To illustrate, the look data 605 includes hairstyles, emotes, virtual clothes, and skins. The game data 604 is stored by the processor system 512 in the memory device system 514 (FIG. 5).

An example of the style data 606 includes data identifying a type of virtual weapon, such as the nunchucks or the long sword or the curved sword, that is used by a virtual character, such as the character C1 (FIG. 1), the virtual character C2, or the virtual character C3, controlled by the user n during the gameplay. An additional example of the style data 606 includes a type of movement of the virtual weapon controlled by the user n. To illustrate, the style data 606 includes whether the virtual weapon controlled by the user n moves from left to right or from right to left. A further example of the style data 606 includes a combination of the type of virtual weapon and the type of movement of the virtual weapon. To illustrate, the processor system 512 assigns a first game style to the user n when the user n controls the virtual character to use the long sword, a second game style to the user n when the user n controls the virtual character to use the nunchuks, and a third game style to the user n when the user n controls the virtual character to use the curved sword. In the illustration, the processor system 512 assigns a fourth game style to the user n when the user n controls the virtual character to move the virtual weapon from left or right during the game and a fifth game style to the user n when the user n controls the virtual weapon to move from right to left.

An example of the skill level data 608 includes a number of virtual rewards, such as a number of virtual points or a number of virtual items or a combination thereof, that are accumulated by the user n while playing the game for one or more gaming sessions. To illustrate, the skill level data is a statistical value, such as a mean or a median, computed by the processor system 512 from the number of virtual points and the number of virtual items. Examples of the virtual items include material items that boosts or helps the user n. To illustrate, the virtual items include healing potions, first aid kits, and bullets. An example of the game context data 609 includes position and orientation data or graphical data or a combination thereof identifying one or more virtual objects and a virtual background of a virtual scene that interacts with the virtual character controlled by the user n. To illustrate, the game context data 609 includes data indicating, such as identifying, movement, such as positions and orientations, of the one or more virtual objects. To further illustrate, the one or more virtual objects include the virtual character C2 that interacts with the virtual character C1, virtual weapons used by the virtual character C2, the virtual character C3 that interacts with the virtual character C1, virtual weapons used by the virtual character C3, one or more NPCs that interact with the virtual character C1, and one or more virtual weapons used by the NPCs. The game context data 609 also includes position and orientation data or graphical data or a combination thereof that identifies the virtual character controlled by the user n. The game context data 609 includes position and orientation data or graphical data or a combination thereof that identifies the virtual weapon used by the virtual character that is controlled by the user n.

The system 600 further includes a data parser 610, a style extractor and classifier 612, a skill classifier 614, a randomizer 620, a context extractor 621, and the AI model 602. As an example, each of the data parser 610, the style extractor and classifier 612, the skill classifier 614, the randomizer 620, the context extractor 621, and the AI model 602 is implemented as hardware, or software, or a combination thereof. Examples of the hardware include a processor, an application specific integrated circuit (ASIC), and a programmable logic device (PLD). Examples of the software include a computer software program. To illustrate, each of the data parser 610, the style extractor and classifier 612, the skill classifier 614, the randomizer 620, the context extractor 621, and the AI model 602 is a computer program or a portion of a computer program that is executed by the processor system 512 (FIG. 5).

The data parser 610 is coupled to the memory device system 514, the style extractor and classifier 612, the skill classifier 614, and the context extractor 621. The style extractor and classifier 612, the skill classifier 614, and the context extractor 621 are coupled to the AI model 602. The randomizer 620 is coupled to the AI model 602 and to the memory device system 514 to access the look data 605.

The data parser 610 accesses, such as reads, the game data 604 from the memory device system 514 and parses the game data 604 to identify the style data 606, the skill level data 608, and the game context data 609. For example, the data parser 610 distinguishes graphical data identifying the virtual character C1 controlled by the user 1 via a client device and data indicating movement of the virtual character C1 from numerical values indicating the number of virtual points accumulated by the user 1 and from graphical data identifying the virtual background or a virtual object of one or more virtual scenes during the one or more gaming sessions. Example of data indicating movement, such as movement data, includes positions and orientations. As another example, the data parser 610 distinguishes graphical data indicating the types of virtual weapons used by the virtual character C1 controlled by the user 1 and data indicating movement of the virtual weapons from data indicating numerical values indicating the number of virtual points and from graphical data identifying the virtual background or the virtual object of one or more virtual scenes.

The data parser 610 provides the style data 606 to the style extractor and classifier 612, the skill level data 608 to the skill classifier 614, and the game context data 609 to the context extractor 621. The style extractor and classifier 612 generates a game style signal 622 identifying a game style based on the style data 606. For example, the style extractor and classifier 612 identifies based on the graphical data indicating the types of virtual weapons, a type of virtual weapon used by the user 1 to control the virtual character C1 or used by the user 2 to control the virtual character C2. To illustrate, the style extractor and classifier 612 identifies from shape and size data of the long sword that the virtual character C1 is carrying the long sword and from shape and size data of the curved sword that the virtual character C3 is carrying the curved sword. As another illustration, the style extractor and classifier 612 identifies from data identifying movement of the virtual weapon held by the virtual character controlled by the user n that the virtual weapon moves from left to right or from right to left. The style extractor and classifier 612 provides the game style signal 622 to the AI model 602. For example, the game style signal 622 indicates the type of virtual weapon used by the virtual character C1 and indicates a type of movement, such as left to right or right to left, of the virtual weapon.

Moreover, the skill classifier 614 receives the skill level data 608 and classifies the skill level data 608 to output a skill classification signal 624. For example, the skill classifier 614 determines whether the number of virtual rewards accumulated within the user account n assigned to the user n is less than a first threshold, between the first threshold and a second threshold or greater than the second threshold. Upon determining that the number of virtual rewards is less than the first threshold, the skill classifier 614 assigns the low skill level to the user n. Also, in response to determining that the number of virtual rewards is between the first and second threshold, the skill classifier 614 assigns a medium skill level to the user n and upon determining that the number of virtual rewards is greater than the second threshold, the skill classifier 614 assigns a high skill level to the user n. The skill classification signal 624 indicates whether the user n is assigned the low skill level, the medium skill level, or the high skill level. The skill level of the user n is also the skill level of the virtual character that is controlled by the user n.

The context extractor 621 receives the game context data 609 from the data parser 610 and determines a game context based on the game context data 609 to output a game context signal 626. For example, the context extractor 621 determines from the graphical data identifying the virtual character C2 and the nunchucks that the virtual character C2 uses the nunchucks to interact with the virtual character C1 and from data indicating movement of the nunchucks that the virtual character C2 swings the nunchucks from right to left when the virtual character C1 swings the long sword from left to right. As another example, the context extractor 621 determines from the graphical data identifying the virtual character C3 and the curved sword that the virtual character C3 uses the curved sword to interact with the virtual character C1 and from data indicating movement of the curved sword that the virtual character C3 swings the curved sword from right to left when the virtual character C1 swings the long sword from left to right. The game context signal 626 identifies whether the virtual character C2 or another virtual character interacts with the virtual character C1 identified by the game style signal 622. The game context signal 626 indicates a type of movement of the other virtual character or a virtual background that interacts with the virtual character n or a type of movement of the virtual weapon used by the other virtual character or a combination thereof.

The AI model 602 is trained based on the game style signal 622, the skill classification signal 624, and the game context signal 626 to generate data for displaying an NPC for the user account n. For example, the AI model 602 receives the game style signal 622 during a first time period indicating that the virtual character C1 is controlled by the user 1 to move the long sword in a manner from left to right, receives the skill classification signal 624 within the first time period indicating that the user 1 has the low skill level, and receives the game context signal 626 during the first time period indicating that the virtual character C2 swings the nunchucks in a manner from right to left to interact with the virtual character C1 to determination a first association between the movement of the long sword in the manner, the low skill level, and the movement of the nunchucks in the manner. In the example, the AI model 602 receives the game style signal 622 during a second time period indicating that the virtual character C1 is controlled by the user 1 to move the long sword in in the same manner as that illustrated in the first association, receives the skill classification signal 624 within the second time period indicating that the user 1 has the same skill level as that illustrated in the first association, and receives the game context signal 626 during the second time period indicating that the virtual character C2 swings the nunchucks in the manner as that illustrated in the first association to determination a second association between the movement of the long sword, the skill level, and the movement of the nunchucks. Further, in the example, the AI model 602 receives the game style signal 622 during a third time period indicating that the virtual character C1 is controlled by the user 1 to move the long sword in an opposite manner, such as from right to left, to that illustrated in the first association, receives the skill classification signal 624 within the second time period indicating that the user 1 has the medium skill level, and receives the game context signal 626 during the second time period indicating that the virtual character C2 swings the nunchucks in an opposite manner, such as from left to right, to that illustrated in the first association to interact with the virtual character C1 to determination a third association between the movement of the long sword in the opposite manner, the medium skill level, and the movement of the nunchucks in the opposite manner. The AI model 602 learns the first, second, and third associations to be trained. As an illustration, an example of an association is a one-to-one correspondence or a link.

Continuing with the example, the AI model 602 receives a signal from the game program. The signal received from the game program indicates that based on an input received from the user 1 via the HHC 104 (FIG. 1), the user 1 does not wish to play the game with any other user, such as the user 2 or 3. To illustrate, the signal indicates that the user 1 logs out of the user account 1 or exits the game. In response to receiving the signal from the game program, the AI model 602 generates data for displaying the NPC C1*a*. The AI model 602 generates the data for displaying the NPC C1*a* based on the game characteristics of the user 1 or a combination of a graphical signal received from the randomizer 620 and the game characteristics. The AI model 602 learns from the first through third associations to be trained based on the game characteristics of the user 1. To illustrate, the AI model 602 determines, from the first through third associations, that a first probability that the user 1 will control the virtual character C1 to use the long sword is greater than a second probability that the user 1 will control the virtual character C1 to use the curved sword, a third probability that the user 1 will control the virtual character C1 to move the long sword in the manner from left to right is greater than a fourth probability that the user 1 will control the virtual character C1 to move the long sword in the opposite manner, and a fifth probability that the user 1 will control the virtual character C1 according to the low skill level is greater than a sixth probability that the user 1 will control the virtual character C1 according to the medium or high skill level.

Moreover, the randomizer 620 generates the graphical signal indicating that representative data, such as the graphical data or size or shape or a combination thereof, of the virtual character C1 be modified in a random manner to output graphical data of the NPC C1*a*. For example, in response to receiving the signal indicating that the user 1 does not wish to play with the other users, the AI model 602 generates a request signal and sends the request signal to the randomizer 620. Moreover, the AI model 602 identifies, within the request signal, the virtual character C1 whose look is to be randomized. Upon receiving the request signal having the identity of the virtual character C1, the randomizer 620 accesses the look data 605, which provides the graphical data of the virtual character C1, from the memory device system 514 and generates the graphical signal indicating a manner for modifying the look data 605 in the random manner to generate the graphical data of the NPC C1*a*. The modification of the representative data of the virtual character C1 does not exceed, such as maintain, a predetermined threshold. Examples of the predetermined threshold include a predetermined set of features, such as a predetermined height, a predetermined width, and a predetermined set of virtual weapons. To illustrate, the graphical signal indicates that the NPC C1*a* look the same as that of the virtual character C1 except that the NPC C1*a* is shorter than the virtual character C1. As another illustration, the predetermined set of features includes shape and size of eyes, virtual clothes, and types of virtual weapons.

The AI model 602 assigns the modified representative data to the NPC C1*a* and generates a signal to send to the game program based on the first, third, and fifth probabilities. The signal to send to the game program indicates that the NPC C1*a* is to be generated and operated according to the modified representative data and is to be generated to have the game characteristics of the user 1 according to the first, third, and fifth probabilities. For example, the signal to send to the game program indicates that the NPC C1*a* will use the long sword, move the long sword in the manner from left to right, and will move according to the low skill level. Upon receiving the signal from the AI model 602, the game program generates and operates, such as moves, the NPC C1*a* based on the signal. For example, the processor system 512 sends data via the computer network 504 to the client device 506 (FIG. 5) operated by the user 1 to display the NPC C1*a* as having the modified representative data, such as holding the long sword, moving the long sword in the manner from left to right, and moving according to the low skill level to represent the game characteristics of the user 1. Upon receiving the data for displaying the NPC C1*a* from the processor system 512, the client device 506 displays the NPC C1*a* based on the data.

In a similar manner, the AI model 602 generates data for displaying the NPC C2*a* upon receiving another graphical signal received from the randomizer 620. For example, upon receiving an indication from the user 1 via the HHC 104 that the user 1 does not wish to play the game with any other user, the processor system 512 generates a notification for display on the display device 102. The notification requests the user 1 for a number of NPCs. In response to the notification, the user 1 selects one or more buttons on the HHC 104 to provide the number of NPCs for the virtual character C1 to interact with in the game. Upon receiving the number of NPCs, the processor system 512 generates data for displaying the NPCs C1*a* and C2*a* of the number. To illustrate, upon receiving the request signal from the AI model 602, the randomizer 620 generates the other graphical signal indicating that representative data of the virtual character C1 or the NPC C1*a* be modified in a random manner to output graphical data of the NPC C2*a*. The modification of the representative data of the virtual character C1 or the NPC C2*a* does not exceed the predetermined threshold. For example, the other graphical signal indicates that the NPC C2*a* look the same as that of the virtual character C1 except that the NPC C2*a* has more hair compared to the virtual character C1 or the NPC C1*a*. The NPC C2*a* is generated by the AI model 602 based on the game characteristics of the user n in the same manner in which the NPC C1*a* is generated by the AI model 602.

In one embodiment, the randomizer 620 is a part or a portion of the AI model 602.

In an embodiment, the AI model 602 is a portion of, such as integrated within, the game program.

In an embodiment, the randomizer 620 generates a signal indicating that the representative data, such as the game characteristic data or graphical data or a combination thereof, of a first NPC, such as the NPC C1*a*, be modified in a random manner to output data of a second NPC, such as the NPC C2*a*. For example, upon generating the data for displaying the first NPC, the AI model 602 generates a request signal and sends the request signal to the randomizer 620. Moreover, the AI model 602 identifies, within the request signal, the first NPC whose representative data is to be randomized. Also, the AI model 602 provides, within the request signal, information identifying the game characteristics and the graphical data of the first NPC. Upon receiving the request signal, the randomizer 620 randomizes, such as randomly modifies, the data for displaying the first NPC. For example, the randomizer 602 modifies the game characteristic data or the graphical data or a combination thereof of the first NPC. To illustrate, the randomizer 602 randomly modifies the first NPC from holding the long sword to holding a knife as a virtual weapon or holding nothing. As another illustration, the randomizer 602 randomly changes the first NPC from having two equally long legs to having a short leg and a long leg to modify the look of the first NPC. The randomizer 602 outputs the signal indicating the representative data to the AI model 602. The representative data includes the random modification to the game characteristics or the graphical data or a combination thereof of the first NPC. Upon receiving the signal having the representative data, the AI model 602 modifies the data for displaying the first NPC to output data for displaying the second NPC. The data for displaying the second NPC is sent from the server system 502 via the computer network 504 to a client device, such as the client device 506, for display on the client device 506 (FIG. 5). The modifications to the data for displaying the first NPC do not exceed the predetermined threshold. To illustrate, the representative data indicates that the NPC C2*a* look the same and functions the same as that of the NPC C1*a* except that the NPC C2*a* is shorter than the NPC C1*a*. As another illustration, the representative data indicates that a majority of game characteristics of the NPC C2*a* are the same as that of learned from the game play by the user 1 by the AI model 602.

FIG. 7 is a diagram of an embodiment of a system 700 to illustrate that game characteristics of multiple users are weighted and then applied by the AI model 602 to generate data for displaying and operating an NPC, such as the NPC C1*c* (FIG. 4). The system 700 includes the AI model 602 and a weight applicator 702. As an example, the weight applicator 702 is implemented as hardware, or software, or a combination thereof. The weight applicator 702 is coupled to the AI model 602.

The AI model 602 determines whether a user m is logged into a user account m and further determines whether the user m is the gaming network friend of the user n, where m is an integer greater than one. For example, the AI model 602 sends a request to the game program to determine that the user m has accepted, via the user account m, a friend request received from the user account n. Upon receiving a response to the request indicating that the user m has accepted the request, the AI model 602 determines that the user m is the gaming network friend of the user n.

In response to determining that the user m is the gaming network friend of the user n, the AI model 602 generates and sends a request to the user account n to obtain permission from the user m regarding using the game characteristics of the user m to generate the NPC C1*c*. For example, the AI model 602 sends the request to the user account 1 for the permission. In response to receiving the request for the permission, the user 1 uses the HHC 104 (FIG. 1) and sends an inquiry via the user account 1 to the user account 2. The inquiry indicates whether the user 2 wishes to share his/her game characteristics with an NPC, such as the NPC C1*a* or C1*b*, that will be used to play the game with the user 1 when the user 2 is offline. In response to receiving the inquiry, the user 2 uses the HHC 142 (FIG. 1B) and replies positively to the inquiry to output a positive response. The positive response is sent from the user account 2 to the user account 1 by the processor system 512 (FIG. 5).

In response to receiving a request to play the game from the user 1 via the HHC 104 (FIG. 1A) and the computer network 504 (FIG. 5), the processor system 512 determines whether the user m is logged into the user account m. Upon determining that the user m is not logged into the user account m and determining that the user account n has received the positive response to the inquiry for the permission to use the NPC, the processor system 512 determines to apply the AI model 602 to generate the data for displaying and operating the NPC based on the game characteristics of the users n and m. For example, in response to receiving an indication from the user 1 via the HHC 104 (FIG. 1) and the computer network 504 (FIG. 5) that the user n has requested to play the game with the user m and determining that the user m is not logged into the user account m, the AI model 602 generates the data for displaying and operating the NPC having the game characteristics of the users n and m. To illustrate, the processor system 512 (FIG. 5) determines whether the request to play the game is made by the user 1 to the user 2 to play the game. As an example, the request is made from the user account 1 to the user account 2 via an internal communication program, such as a voice chat program or a text chat program or a group chat program, that is integrated with the game program. Upon determining that the request is sent from the user account 1 to the user account 2 and the user 2 is not logged into the user account 2 within a predetermined time period from which the request is received by the user account 2, the processor system 512 determines to apply the AI model 602 to generate the data for displaying the NPC based on the game characteristics of the user 2.

As another example, in response to determining that the user 1 has requested via the HHC 104 (FIG. 1), the user account 1, and the computer network 504 (FIG. 5) to play the game with the user m and determining that the user m is not logged into the user account m, the AI model 602 generates data for displaying and operating the NPC having a first predetermined percentage of the game characteristics of the user n and a second predetermined percentage of the game characteristics of the user m. To illustrate, in response to determining that the user 1 has requested to play the game with the user m and determining that the user m is not logged into the user account m, the AI model 602 sends a request to the weight applicator 702 to determine a first amount, such as the first predetermined percentage, of weight to apply to the game characteristics of the user n, and to determine a second amount, such as the second predetermined percentage, of weight to apply to the game characteristics of the user m. In response to the request, the weight applicator 702 provides the first and second amounts to the AI model 602.

The AI model 602 generates data for displaying and operating the NPC that has the first amount of game characteristics of the user n and the second amount of game characteristics of the user m. For example, the data for displaying and operating the NPC C1*c* is generated by the AI model 602. The NPC C1*c* uses the long sword for a first amount of time and uses the nunchuks for a second amount of time during a game session of the game. The AI model 602 determines a total amount of time of the game session based on a statistical value, such as an average or median, of amounts of time of previous game sessions of the user n. The AI model 602 determines the first amount of time to be the first predetermined percentage of the total amount of time and the second amount of time to be the second predetermined percentage of the total amount of time. As another example, the NPC C1*c* moves the long sword from left to right for the first amount of time and moves the nunchuks from right to left for the second amount of time of the game session. As yet another example, the NPC C1*c* applies the low skill level of the user 1 for the first amount of time and the medium skill level of the user 2 for the second amount of time. As another example, the NPC C1*c* is controlled by the AI model 602 to perform a first virtual action, such as jumping or shooting, based on the game characteristics of the user n and a second virtual action, such as running or ducking or walking, based on the game character of the user m.

It should be noted that the AI model 602 communicates the game program to control an NPC, described herein. For example, the AI model 602 controls the NPC C1*c* to interact with the virtual character C1 based on a user input received from the HHC 104 (FIG. 1) via the computer network 504 and based on laws of physics implemented within the game program. The game program has instructions regarding controlling movement of the NPC C1*c* based on movement of the virtual character C1 and based on the laws of physics. For example, when the virtual character C1 moves the long sword from right to left, the AI model 602 communicates with the game program to control the NPC C1*c* to jump or move the curved sword in a direction opposite to the movement of the long sword.

In one embodiment, the user 1 uses the HHC 104 to include within the inquiry regarding share the game characteristics of the user 2 with an NPC, such as the NPC C1*a*, an indication that the user 1 will provide a virtual reward to the user 2 when the user 2 allows his/her game characteristics with the NPC used to play the game with the user 1. In response to receiving the inquiry, the user 2 uses the HHC 142 (FIG. 1B) and replies positively to the inquiry to output the positive response. When the user 2 responds positively to the inquiry, the processor system 512 credits the user account 2 with the virtual reward.

In an embodiment, the processor system 512 determines whether a predetermined amount of time has passed since the user account 2 receives the inquiry regarding share the game characteristics of the user 2 with an NPC, such as the NPC C1*a*. For example, when the user 2 does not log into the user account 2, the predetermined amount of time passes. In response to determining that the predetermined amount of time has passed, the processor system 512 identifies another user, such as the user 3, as a gaming network friend of the user 1 and determines whether the game characteristics of the other user are substantially similar to, such as the same as, the game characteristics of the user 2. For example, the processor system 512 determines that a skill level of the user 3 is within a preset skill range from, such as the same as, a skill level of the user 2 or whether the user 3 has a game style that is within a preset style range, such as the same as, a game style of the user 2 or a combination thereof. To illustrate, the medium skill level is within the preset range from the low skill level and the high skill level is outside the preset range from the low skill level. Moreover, as another illustration, the game style of the user 3 is within the preset style range from the game style of the user 2 when the user 3 uses the same virtual weapon in the game as that used by the user 2 or moves the virtual weapon in the same direction for a majority of times as that moved by the user 2 or a combination thereof. Upon determining that the game characteristics of the other user are substantially similar to the game characteristics of the user 2, the processor system 512 sends a request for the permission from the other user in the same manner in which the user 2 is requested for the permission. Also, when the permission is received from the other user, the game characteristics of the other user are integrated within the NPC in the same manner in which the game characteristics of the user 2 are integrated within the NPC.

In one embodiment, upon determining that none of the gaming network friends of the user n are online, the processor system 512 generates data for displaying a list of parameters and sends the data via the computer network 504 to the client device operated by the user n. Examples of the parameters include the game characteristics. To illustrate, the parameters include a style of gameplay of a user and a skill level of the user. In response to receiving the data, the display device 102 displays the list. The user n uses an HHC, such as the HHC 104, operated by the user n to select one or more of the parameters and an indication of the selection is sent from the client device operated by the user n via the computer network 504 to the server system 502. The processor system 512 identifies based on the parameters, an NPC that has the parameters from multiple NPCs stored in the memory device system 514, and sends data for displaying and operating the NPC via the computer network 504 to the client device operated by the user n. The user n uses the HHC to control a virtual character, such as the virtual character VC1, to interact with the NPC.

Figure 8:
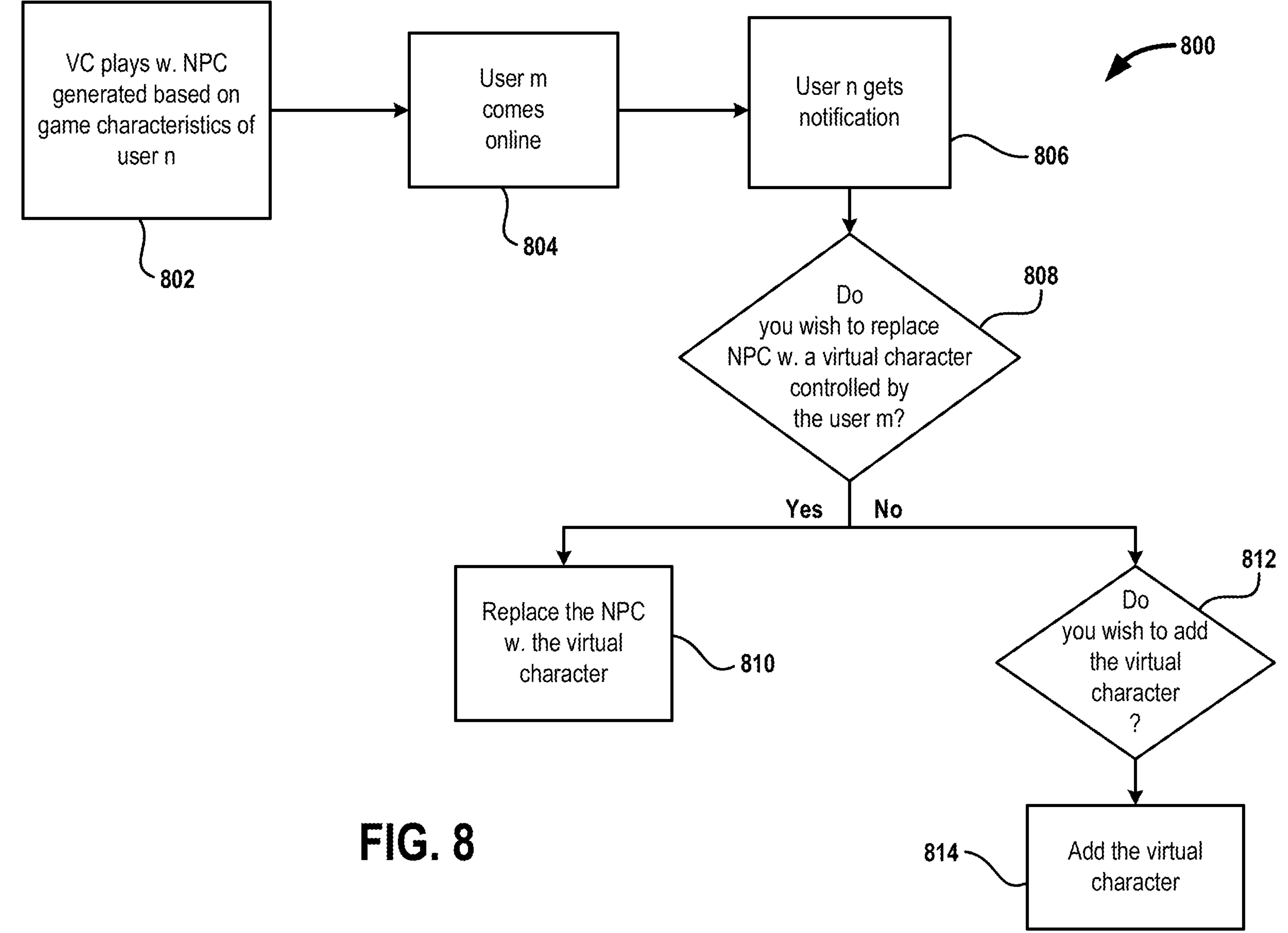
FIG. 8 is a flowchart to illustrate an embodiment of a method for determining whether to continue to use an NPC generated based on game characteristics of a user to interact with a virtual character.

FIG. 8 is a flowchart to illustrate an embodiment of a method 800 for determining whether to continue to use an NPC, such as the NPC C1*a* or C1*b* (FIG. 1A) or C2*a* or C3*a* (FIG. 3), generated based on the game characteristics of the user n to interact with the virtual character C1. The method 800 is executed by the processor system 512 (FIG. 5). In the method 800, the processor system 512 determines, in an operation 802, that when the user m is offline, the virtual character C1 interacts with the NPC generated based on the game characteristics of the user n. For example, the user m is offline when the user m is not logged into the user account m. The virtual character C1 is controlled by the user n.

In an operation 804 of the method 800, the processor system 512 determines that the user m has come online. For example, the processor system 512 determines that the user m logs into the user account m. Upon determining that the user m logs into the user account m, in an operation 806 of the method 800, the processor system 512 generates data for displaying a notification indicating that the user m is now online. Also, in an operation 808 of the method 800, the processor system 512 generates data for displaying a notification inquiring whether the user n wishes to replace the NPC with a virtual character controlled by the user m in a display of a virtual scene, such as the virtual scene 302 (FIG. 3). The processor system 512 sends the data for displaying the notifications via the computer network 504 to the client device, such as the client device 506 (FIG. 5), operated by the user n. Upon receiving the data, the client device operated by the user n displays the notifications.

When the user n reviews the notifications, the user n operates an HHC, such as the HHC 104 (FIG. 1), controlled by the user n to indicate that the user n wishes to replace the NPC with the virtual character controlled by the user m. The client device operated by the user n sends the indication via the computer network 504 to the processor system 512. Upon receiving the indication, the processor system 512 replaces, in an operation 810 of the method 800, the data for displaying and operating the NPC with data for displaying and operating the virtual character controlled by the user m.

On the other hand, the user n operates the HHC controlled by the user n to indicate that the user n does not wish to replace the NPC with the virtual character controlled by the user m. The client device operated by the user n sends the indication that the user n does not wish to replace the NPC via the computer network 504 to the processor system 512. Upon receiving the indication, in an operation 812 of the method 800, the processor system 512 generates data for displaying another notification indicating whether the user n wishes to add, instead of replace, the virtual character controlled by the user m to the virtual scene, such as the virtual scene 302 (FIG. 3), having a display of the NPC. The data for displaying the other notification is sent from the processor system 512 via the computer network 504 to the client device operated by the user n.

Upon receiving the data for displaying the other notification, the client device operated by the user n displays the other notification on the display device 102 (FIG. 1A). When the other notification is reviewed by the user n, the user n operates the HHC to provide an indication that the user n wishes to add the virtual character controlled by the user m to the virtual scene displayed on the display device 102. The indication that the user n wishes to add the virtual character controlled by the user m is sent via the computer network 504 to the processor system 512. Upon receiving the indication that the user n wishes to add the virtual character controlled by the user m, the processor system 512 adds, in an operation 814 of the method 800, data for displaying the virtual character controlled by the user m. For example, the processor system 512 generates the data for displaying the virtual character controlled by the user m and sends the data via the computer network 504 to the client device operated by the user n. Upon receiving the data for displaying the virtual character controlled by the user m, the client device operated by the user n displays, within the virtual scene, the virtual character controlled by the user m.

In an embodiment, data for displaying the notification regarding whether the user n wishes to replace the NPC with a virtual character controlled by the user m is not generated. Rather, the operation 806 is followed by the operation 810.

In one embodiment, the processor system 512 maintains a library of famous NPCs. The famous NPCs are generated by the processor system 512 based on game characteristics of famous people, such as celebrities, singers, actors, sports players, and business people, in the same manner in which the NPC C1*a* is generated based on the game characteristics of the user 1. A person who is not famous, such as the user n, can access one or more of the famous NPCs from the library. For example, the display device 102 (FIG. 1) displays the famous NPCs with rewards, such as virtual rewards or other rewards, to be provided to the famous people for use of the NPCs. For example, each virtual reward is linked with a respective famous NPC. The user 1 uses the HHC 104 (FIG. 1) to select one of the NPCs. An indication of the selection is sent from the client device operated by the user 1 via the computer network 504 (FIG. 5) to the processor system 512 (FIG. 5). The processor system 512 credits a user account of the famous person with the reward linked to the NPC that is selected.

Figure 9:
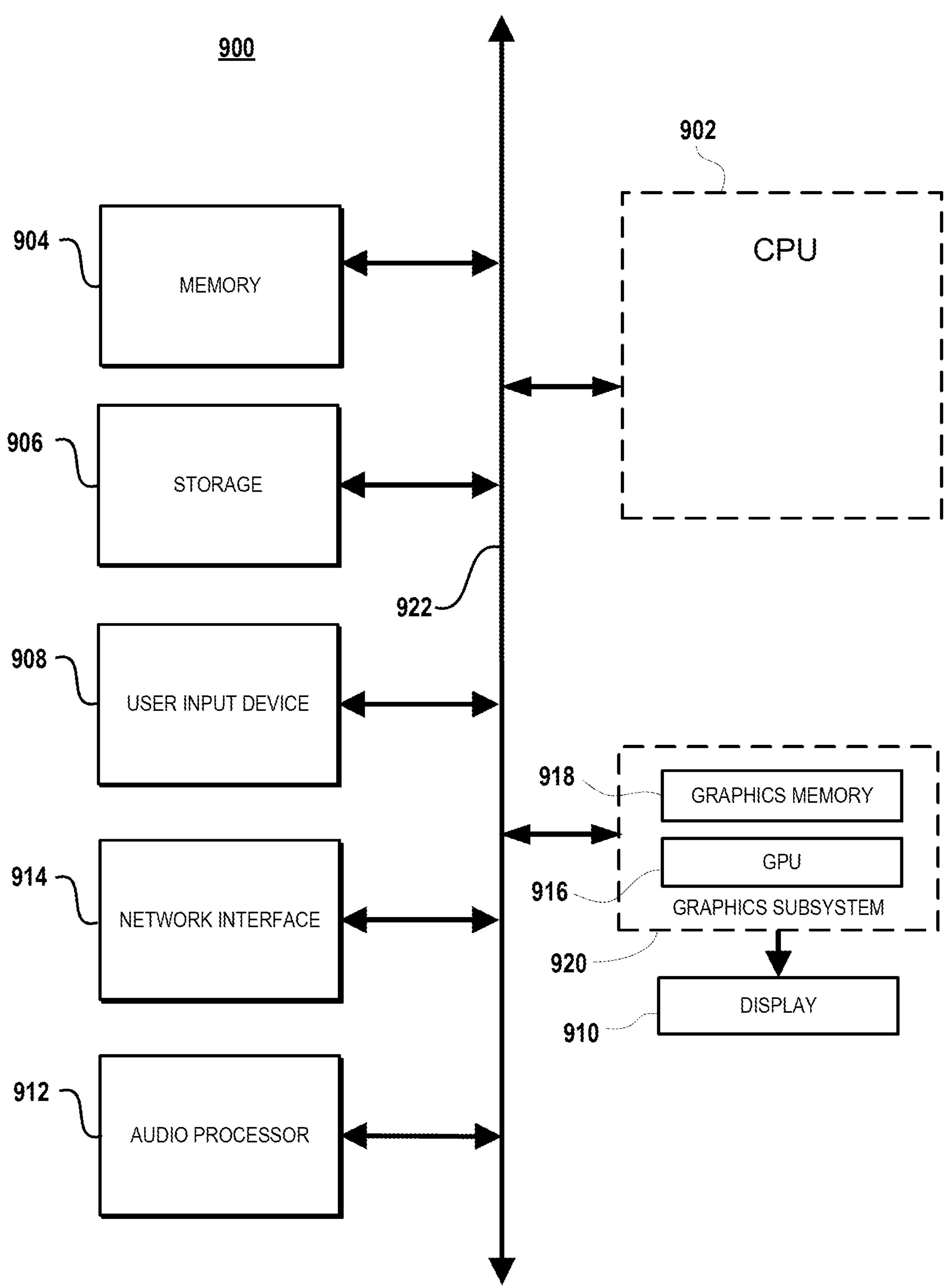
FIG. 9 illustrates components of an example device, such as a client device or a server system, described herein, that can be used to perform aspects of the various embodiments of the present disclosure.

FIG. 9 illustrates components of an example device 900, such as a client device or a server system, described herein, that can be used to perform aspects of the various embodiments of the present disclosure. This block diagram illustrates the device 900 that can incorporate or can be a personal computer, a smart phone, a video game console, a personal digital assistant, a server or other digital device, suitable for practicing an embodiment of the disclosure. The device 900 includes a CPU 902 for running software applications and optionally an operating system. The CPU 902 includes one or more homogeneous or heterogeneous processing cores. For example, the CPU 902 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 900 can be a localized to a player, such as a user, described herein, playing a game segment (e.g., game console), or remote from the player (e.g., back-end server processor), or one of many servers using virtualization in a game cloud system for remote streaming of gameplay to clients.

A memory 904 stores applications and data for use by the CPU 902. A storage 906 provides non-volatile storage and other computer readable media for applications and data and may include fixed disk drives, removable disk drives, flash memory devices, compact disc-read only memory (CD-ROM), digital versatile disc-ROM (DVD-ROM), Blu-ray, high definition-digital versatile disc (HD-DVD), or other optical storage devices, as well as signal transmission and storage media. User input devices 908 communicate user inputs from one or more users to the device 900. Examples of the user input devices 908 include keyboards, mouse, joysticks, touch pads, touch screens, still or video recorders/cameras, tracking devices for recognizing gestures, and/or microphones. A network interface 914, such as a NIC, allows the device 900 to communicate with other computer systems via an electronic communications network, and may include wired or wireless communication over local area networks and wide area networks, such as the internet. An audio processor 912 is adapted to generate analog or digital audio output from instructions and/or data provided by the CPU 902, the memory 904, and/or data storage 906. The components of device 900, including the CPU 902, the memory 904, the data storage 906, the user input devices 908, the network interface 914, and an audio processor 912 are connected via a data bus 922.

A graphics subsystem 920 is further connected with the data bus 922 and the components of the device 900. The graphics subsystem 920 includes a graphics processing unit (GPU) 916 and a graphics memory 918. The graphics memory 918 includes a display memory (e.g., a frame buffer) used for storing pixel data for each pixel of an output image. The graphics memory 918 can be integrated in the same device as the GPU 916, connected as a separate device with the GPU 916, and/or implemented within the memory 904. Pixel data can be provided to the graphics memory 918 directly from the CPU 902. Alternatively, the CPU 902 provides the GPU 916 with data and/or instructions defining the desired output images, from which the GPU 916 generates the pixel data of one or more output images. The data and/or instructions defining the desired output images can be stored in the memory 904 and/or the graphics memory 918. In an embodiment, the GPU 916 includes three-dimensional (3D) rendering capabilities for generating pixel data for output images from instructions and data defining the geometry, lighting, shading, texturing, motion, and/or camera parameters for a scene. The GPU 916 can further include one or more programmable execution units capable of executing shader programs.

The graphics subsystem 914 periodically outputs pixel data for an image from the graphics memory 918 to be displayed on the display device 910. The display device 910 can be any device capable of displaying visual information in response to a signal from the device 900, including a cathode ray tube (CRT) display, a liquid crystal display (LCD), a plasma display, and an organic light emitting diode (OLED) display. The device 900 can provide the display device 910 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUS.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A computer-implemented method comprising:

determining, based on a user input from a first player, that (i) the first player does not wish to play a game for a session with a second player and (ii) the second player has given permission for an artificial intelligence (AI) model to generate nonplayer characters using the second player's game characteristics;

generating, using the AI model, a nonplayer character that exhibits similar characteristics as the second player to interact in a video game with a character controlled by the first player; and providing the nonplayer character in the video game to interact with the character controlled by the first player.

2. The computer-implemented method of claim 1, comprising:

generating a request to obtain permission from the second player to use the game characteristics of the second player to generate the non-player characters;

transmitting the request to the second player; and receiving a positive response from the second player in which the second player has given permission for the AI model to generate the nonplayer characters using the second player's game characteristics.

3. The computer-implemented method of claim 1, comprising:

determining, by the AI model, the second player is a gaming network friend of the first player before generating a request to obtain permission from the second player to use the game characteristics of the second player to generate the nonplayer characters.

4. The computer-implemented method of claim 3, wherein determining, by the AI model, the second player is a gaming network friend of the first player comprises:

transmitting a request to the second player to determine whether the second player has accepted a friend request from the first player; and receiving a response to the request indicating that the second player has accepted the friend request.

5. The computer-implemented method of claim 1, wherein generating, using the AI model, a nonplayer character that exhibits similar characteristics as the second player to interact in a video game with a character controlled by the first player comprises:

generating, using the AI model, a nonplayer character having a first percentage of characteristics of the first player and a second percentage of characteristics of the second player.

6. The computer-implemented method of claim 1, wherein generating, using the AI model, a nonplayer character having a first percentage of characteristics of the first player and a second percentage of characteristics of the second player comprises:

determining, using a weight applicator, the first percentage of weight to apply to the characteristics of the first player to generate a first amount;

determining, using the weight applicator, the second percentage of weight to apply to the characteristics of the second player to generate a second amount; and providing the first amount and the second amount to the AI model to generate a nonplayer character that has the first amount of characteristics of the first player and the second amount of game characteristics of the second player.

7. A computer-implemented method of claim 1, wherein the characteristics of the player comprise (i) a style of gameplay of the player, and (ii) a skill level of the player.

8. A system comprising:

one or more computing devices; and one or more storage devices communicatively coupled to the one or more computers, wherein the one or more storage devices store instructions that, when executed by the one or more computing devices, cause the one or more computing devices to perform operations comprising:

determining, based on a user input from a first player, that (i) the first player does not wish to play a game for a session with a second player and (ii) the second player has given permission for an artificial intelligence (AI) model to generate nonplayer characters using the second player's game characteristics;

generating, using the AI model, a nonplayer character that exhibits similar characteristics as the second player to interact in a video game with a character controlled by the first player; and providing the nonplayer character in the video game to interact with the character controlled by the first player.

9. The system of claim 1, wherein the operations comprise:

generating a request to obtain permission from the second player to use the game characteristics of the second player to generate the non-player characters;

transmitting the request to the second player; and receiving a positive response from the second player in which the second player has given permission for the AI model to generate the nonplayer characters using the second player's game characteristics.

10. The system of claim 1, wherein the operations comprise:

determining, by the AI model, the second player is a gaming network friend of the first player before generating a request to obtain permission from the second player to use the game characteristics of the second player to generate the nonplayer characters.

11. The system of claim 3, wherein determining, by the AI model, the second player is a gaming network friend of the first player comprises:

transmitting a request to the second player to determine whether the second player has accepted a friend request from the first player; and receiving a response to the request indicating that the second player has accepted the friend request.

12. The system of claim 1, wherein generating, using the AI model, a nonplayer character that exhibits similar characteristics as the second player to interact in a video game with a character controlled by the first player comprises:

generating, using the AI model, a nonplayer character having a first percentage of characteristics of the first player and a second percentage of characteristics of the second player.

13. The system of claim 1, wherein generating, using the AI model, a nonplayer character having a first percentage of characteristics of the first player and a second percentage of characteristics of the second player comprises:

determining, using a weight applicator, the first percentage of weight to apply to the characteristics of the first player to generate a first amount;

determining, using the weight applicator, the second percentage of weight to apply to the characteristics of the second player to generate a second amount; and providing the first amount and the second amount to the AI model to generate a nonplayer character that has the first amount of characteristics of the first player and the second amount of game characteristics of the second player.

14. A system of claim 1, wherein the characteristics of the player comprise (i) a style of gameplay of the player, and (ii) a skill level of the player.

15. One or more non-transitory computer storage media storing instructions that when executed by one or more computers cause the one or more computers to perform operations comprising:

determining, based on a user input from a first player, that (i) the first player does not wish to play a game for a session with a second player and (ii) the second player has given permission for an artificial intelligence (AI) model to generate nonplayer characters using the second player's game characteristics;

generating, using the AI model, a nonplayer character that exhibits similar characteristics as the second player to interact in a video game with a character controlled by the first player; and providing the nonplayer character in the video game to interact with the character controlled by the first player.

16. The one or more non-transitory computer readable media of claim 1, wherein the operations comprise:

generating a request to obtain permission from the second player to use the game characteristics of the second player to generate the non-player characters;

transmitting the request to the second player; and receiving a positive response from the second player in which the second player has given permission for the AI model to generate the nonplayer characters using the second player's game characteristics.

17. The one or more non-transitory computer readable media of claim 1, wherein the operations comprise:

determining, by the AI model, the second player is a gaming network friend of the first player before generating a request to obtain permission from the second player to use the game characteristics of the second player to generate the nonplayer characters.

18. The one or more non-transitory computer readable media of claim 3, wherein determining, by the AI model, the second player is a gaming network friend of the first player comprises:

transmitting a request to the second player to determine whether the second player has accepted a friend request from the first player; and receiving a response to the request indicating that the second player has accepted the friend request.

19. The one or more non-transitory computer readable media of claim 1, wherein generating, using the AI model, a nonplayer character that exhibits similar characteristics as the second player to interact in a video game with a character controlled by the first player comprises:

generating, using the AI model, a nonplayer character having a first percentage of characteristics of the first player and a second percentage of characteristics of the second player.

20. The one or more non-transitory computer readable media of claim 1, wherein generating, using the AI model, a nonplayer character having a first percentage of characteristics of the first player and a second percentage of characteristics of the second player comprises:

determining, using a weight applicator, the first percentage of weight to apply to the characteristics of the first player to generate a first amount;

determining, using the weight applicator, the second percentage of weight to apply to the characteristics of the second player to generate a second amount; and providing the first amount and the second amount to the AI model to generate a nonplayer character that has the first amount of characteristics of the first player and the second amount of game characteristics of the second player.

* * * * *